United States Patent
Krishnan Gorumkonda et al.

(10) Patent No.: US 11,501,528 B1
(45) Date of Patent: Nov. 15, 2022

(54) SELECTOR INPUT DEVICE TO PERFORM OPERATIONS ON CAPTURED MEDIA CONTENT ITEMS

(71) Applicant: Snap Inc., Santa Monica, CA (US)

(72) Inventors: Gurunandan Krishnan Gorumkonda, Seattle, WA (US); Marian Pho, North Plainfield, NJ (US); Karl Bayer, New York, NY (US); Shree K. Nayar, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/138,341

(22) Filed: Dec. 30, 2020

Related U.S. Application Data (60) Provisional application No. 62/954,923, filed on Dec. 30, 2019.

(51) Int. Cl.
   *G06V 20/20* (2022.01)
   *G06V 30/40* (2022.01)
   *G06V 30/142* (2022.01)
   *G06V 30/224* (2022.01)
   *G06V 30/10* (2022.01)

(52) U.S. Cl.
   CPC ............ *G06V 20/20* (2022.01); *G06V 30/142* (2022.01); *G06V 30/224* (2022.01); *G06V 30/40* (2022.01); *G06V 30/10* (2022.01)

(58) Field of Classification Search
   CPC ...... G06V 20/20; G06V 30/40; G06V 30/224; G06V 30/142; G06V 30/10
   See application file for complete search history.

(56) References Cited

U.S. PATENT DOCUMENTS

| | | | | |
|---|---|---|---|---|
| 8,442,847 | B1 * | 5/2013 | Shrivastava | G06Q 40/08 705/35 |
| 8,990,235 | B2 * | 3/2015 | King | G06F 40/197 707/769 |
| 9,595,059 | B2 * | 3/2017 | Knudson | G06Q 30/0631 |
| 2007/0086654 | A1 * | 4/2007 | James | G06Q 10/10 382/186 |
| 2007/0226321 | A1 * | 9/2007 | Bengtson | H04N 1/2183 709/219 |
| 2015/0227780 | A1 * | 8/2015 | Tussy | G06F 16/583 382/118 |

\* cited by examiner

*Primary Examiner* — Gregory M Desire
(74) *Attorney, Agent, or Firm* — Schwegman Lundberg & Woessner, P.A.

(57) ABSTRACT

An apparatus to perform functions on media content items comprises a camera, a communication interface, and a selector input device. The selector input device is communicatively coupled to the camera and the communication interface and has a function setting. In response to detecting activation of the selector input device, the camera captures a media content item and the communication interface transmits the media content item to the server for function processing. The selector input device can be a rotary wheel. To select the function setting from the plurality of settings, the user can rotate the rotary wheel to a function setting and press the rotary wheel. Other embodiments are described herein.

21 Claims, 7 Drawing Sheets

SELECTOR INPUT DEVICE TO PERFORM OPERATIONS ON CAPTURED MEDIA CONTENT ITEMS

CROSS REFERENCED TO RELATED APPLICATIONS

This claims priority to U.S. Provisional Patent Application Ser. No. 62/954,923, filed Dec. 30, 2019, the contents of which are incorporated herein by reference in their entirety.

BACKGROUND

Consumer electronic devices are typically adapted to capture image, audio and video content. For example, a user can now use his mobile device to quickly capture a picture or video that he wishes to save for himself and review at a later time.

In order to achieve this, the user may first need to unlock his mobile device, locate the camera application, capture the picture or video using the camera, and then save the picture or video to his device's storage. At a later time, the user may assess his picture or video by unlocking his mobile device, locate the device's storage where the picture or video is stored, and locate the picture or video. This process is cumbersome and there is a growing demand to render for more seamlessness.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Embodiments of the present disclosure improve the functionality of client devices and systems by facilitating the capture of media content items (e.g., pictures and videos) and better anticipating what operations the user wishes to perform with the media content items.

Among other things, embodiments of the present disclosure comprise an apparatus that comprises a housing or an external case that includes a selector input device (or a selector input element). The selector input device that can be activated by a user of the apparatus or client device to cause the camera included in the apparatus to capture a media content item and automatically transmits the media content item to a server which performs a function using the media content item. The apparatus then receives a result of the function from the server. Examples of functions include performing optical character recognition (OCR), scanning, performing image recognition, or any combination thereof.

Via the selector input device, the user would benefit from this rapid processing of the media content item. In one example, the apparatus with the selector input device further allows for faster processing of the media content item since the user is not required to unlock the client device to access the camera.

Apparatus with Selector Input Device

Figure 1:
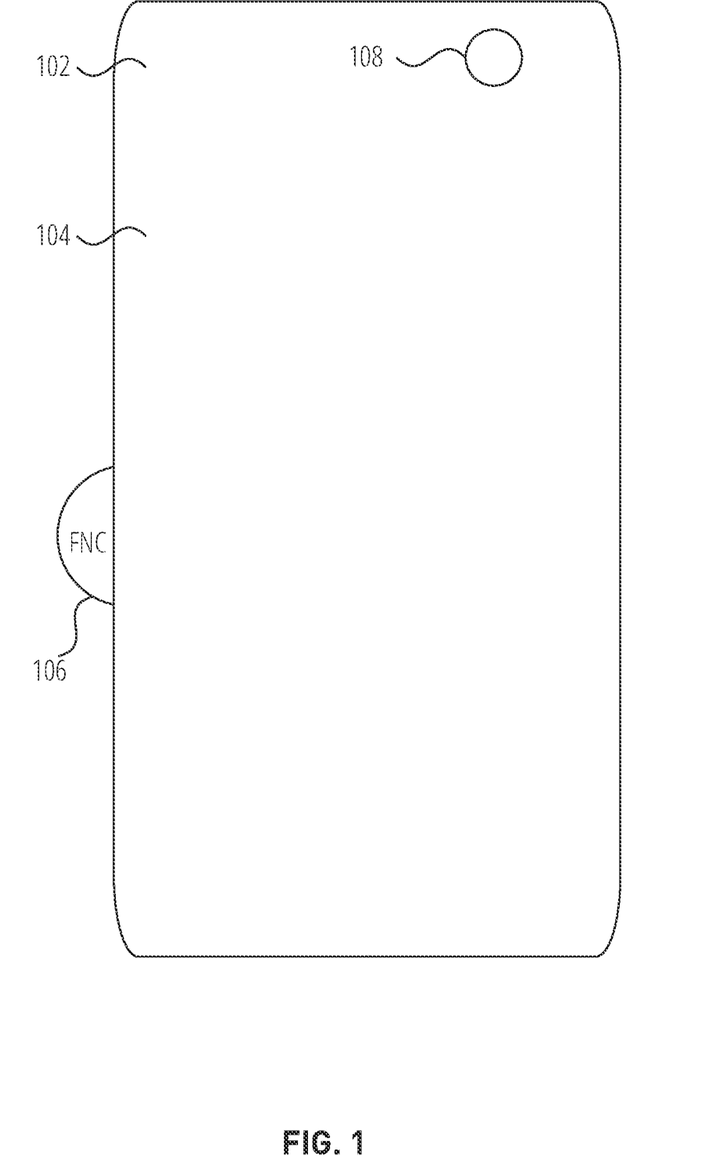
FIG. 1 illustrates a system 100 in which the apparatus 102 with a selector input client device 302 can be implemented according to one example embodiment

FIG. 1 illustrates a system 100 in which the apparatus 102 with a selector input device 106 can be implemented according to one example embodiment. The system 100 in FIG. 1 comprises an apparatus 102 and a client device 302 (not shown).

The apparatus 102 comprises a housing case or a device extension that can be coupled to a client device 302. A housing case can be a protective case for the client device 302. The device extension can be an external device that can be coupled to the client device 302, for example, magnetically.

Figure 5:
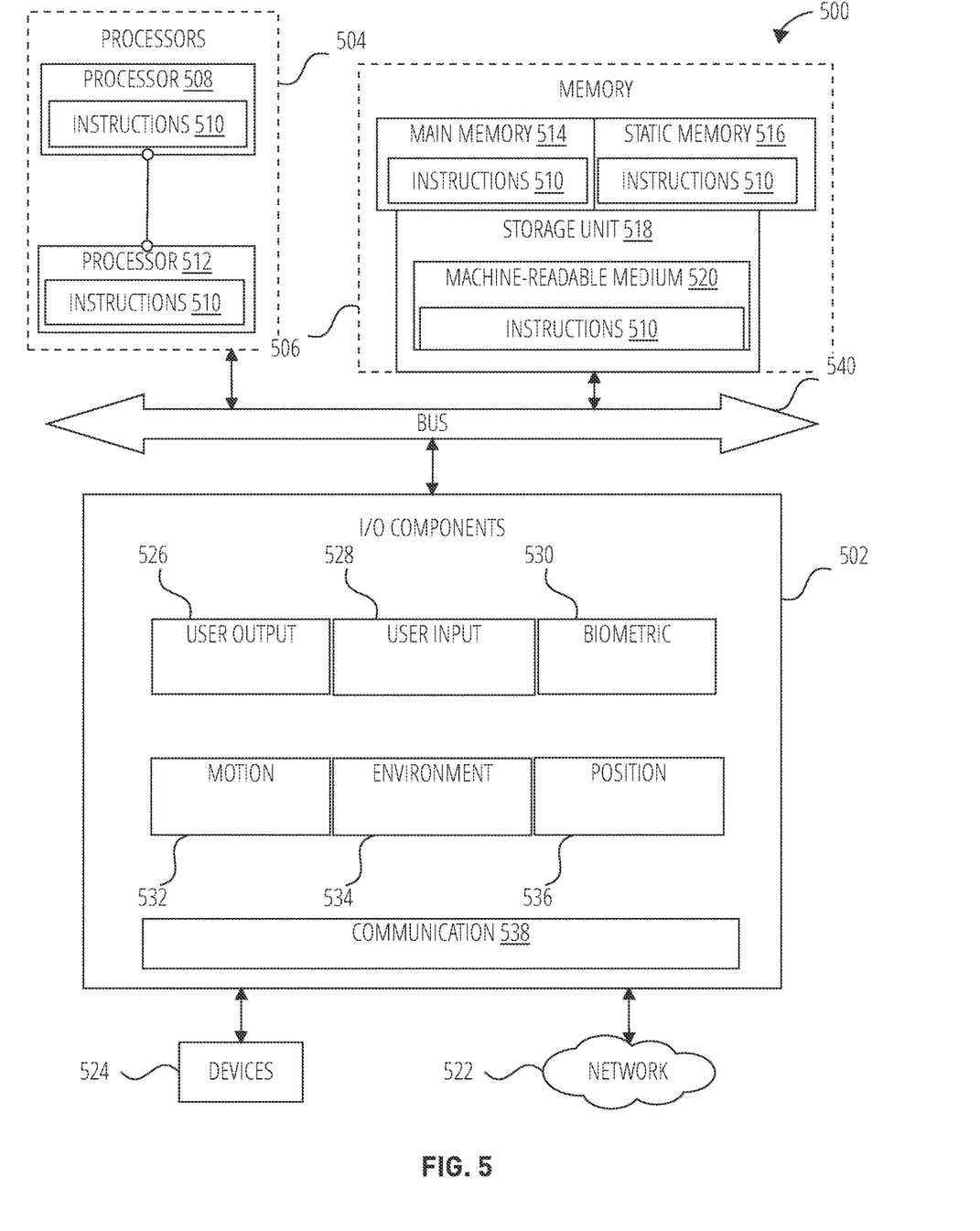
FIG. 5 is a diagrammatic representation of a machine in the form of a computer system within which a set of instructions may be executed for causing the machine to perform any one or more of the methodologies discussed herein, in accordance with some examples.

In some embodiments, the apparatus 102 that is a housing case or a device extension includes a camera 108 that is separate from a camera included in the client device. It is also understood that, in other embodiments, rather than being an external case or housing, the apparatus 102 is incorporated in any client device having a camera. For example, the client device can be the machine 500 as illustrated in FIG. 5.

As shown in FIG. 1, the apparatus 102 comprises a housing 104, a camera 108 with a camera opening, and a selector input device 106. While not shown in FIG. 1, the apparatus 102 can also comprise a camera lens, a camera image sensor, a processor, and a communication interface. In one embodiment, the housing 104 is shaped to be coupled to a client device. In another embodiment, the housing 104 is the housing of the client device having the camera and the microphone or microphones.

In one embodiment, the camera opening is an opening in the housing 104 that couples to a camera lens of the camera 108 included in the apparatus 102. In one embodiment, the camera opening can be a window allowing the camera lens to capture image or video content (e.g., media content items). The camera 108 can include the camera lens and an image sensor.

The camera lens may be a perspective camera lens or a non-perspective camera lens. A non-perspective camera lens may be, for example, a fisheye lens, a wide-angle lens, an omnidirectional lens, or the like. The image sensor captures images or digital video through the camera lens. The images may be also be a still image frame or a video including a plurality of still image frames.

The selector input device 106 can be an activation button that is a physical button or a virtual button. The selector input device 106 can be activated by the user of the apparatus 102 or a client device to cause the camera 108 to capture a media content item (e.g., picture, video, etc.) and automatically cause the communication interface of the apparatus 102 to transmit the media content item to a server for processing.

The selector input device 106 can be communicatively coupled to the camera 108 and the communication interface. In one example, the activation of the selector input device 106 is a single press or click of the selector input device 106 which causes the camera 108 to capture the media content item.

In another example, the activation of the selector input device 106 can be an engagement of the selector input device for a period of time. For example, the user presses and holds the selector input device 106 to cause the activation of the selector input device 106. In response to detecting the engagement of the selector input device 106 for the period of time, the apparatus 102 captures a media content item that is a video that lasts the duration of the period of time that the user is pressing and holding the selector input device 106 using the camera 108.

The selector input device 106 includes at least one setting or selection. While not shown, the selector input device 106 can also include a plurality of settings or selections. In FIG. 1, the selector input device 106 includes the function setting that is labeled "function" or "FNC". The function setting can allow the user to perform operations such as shop, scan, catalogue, image process, etc. using the media content item. In conjunction with the selector input device 106, a server (not shown) can be used to perform functions such as performing optical character recognition (OCR), scanning, performing image recognition, perform image manipulation using geometric functions, or any combination thereof.

As shown in FIG. 1, the selector input device 106 can be a rotary wheel that can be rotated and pressed. For example, the user selects the setting that is labeled function from the plurality of settings by rotating the rotary wheel to the setting, and by pressing the rotary wheel.

In another embodiment, the selector input device 106 is a plurality of buttons that are associated with the plurality of settings. The user can select the function setting from the plurality of settings by pressing a button included in the plurality of buttons that is associated with the function setting.

In another embodiment, the selector input device 106 is a slider having a plurality of positions that are associated with the plurality of settings. The user can select a setting from the plurality of settings by setting the slider to a position included in the plurality of positions that is associated with the function setting.

The selector input device 106 can be communicatively coupled to the camera and the communication interface. In response to receiving a selection of a function setting (e.g., "FNC") included in the plurality of settings from the selector input device 106, the processor captures a media content item using the camera, transmits the media content item using the communication interface to a server that performs a function associated with the function setting. The communication interface can also transmit the media content item to a client device associated with the user of the apparatus 102 for viewing and storage in the client device.

For example, a user on his commute to work may see an item (e.g., article of clothing, accessory, electronic device, etc.) that is worn or used by another person. The user can also see the item in an advertisement. If the user is interested in learning more about the item to determine if he wanted to purchase the item, the user can activate the function setting to cause the camera to capture a picture of the item.

The server, in this example, receives the picture and performs image recognition on the picture. For example, to perform the image recognition, the server can identify an object (or item) in the picture using visual processing, identify a product associated with the object (or item), and obtain information associated with the product via a network. The information associated with the product can include a price, a retailer, a seller, a make, a model, a brand, or product specifications. The apparatus 102 can receive the information associated with the product from the server and cause the information to be displayed by a display device of the client device. In one embodiment, the information is displayed by the client device when the user retrieves the picture for review using the client device.

In one embodiment, the server can include a neural network to perform the image recognition. The neural network can be a Convolution Neural Network (CNN) or a Recurrent (RNN).

In another example, the user can also take a picture of a document that he wishes to scan or turn into a pdf file. The user can activate the function setting to cause the camera to capture a picture of the document. The picture of the document (e.g., media content item) is transmitted to the server to have the media content item scanned or converted into a different format (e.g., pdf file). The scanned or converted file is then transmitted back to the client device associated with the apparatus 102 for display or storage. In one embodiment, the server can also manipulate the media content item using geometric functions to, for example, align the document with the frame of the picture.

In another example, the user wants OCR to be performed on the words that appear in a picture or video. The user can activate the function setting to cause the camera to capture a picture or video. The picture or video (e.g., media content item) is transmitted to the server to perform OCR. The results of the OCR are then transmitted back to the client device associated with the apparatus 102 for display or storage.

In one example, one server can perform all the different functions. In another embodiment, each of the different functions is performed by a different server.

In one embodiment, the processor in the apparatus 102 determines which function to perform based on an analysis of the media content item. For example, if the media content item is a picture of a page including more than a predetermined number of words, the processor determines that the scanning or OCR functions are to be performed. In one embodiment, the processor analyses the media content item to determine the function to be performed by the server based on the media content item and then transmits an instruction to the server to perform the determined function.

In one embodiment, prior to transmitting the media content item to the server, the processor included in the apparatus 102 can cause a notification to be displayed on the display device of the client device. The notification can provide a list of functions that can be performed using the media content item captured by the camera. Each of the functions in the list of functions can be a plurality of selectable interface items. For example, the selectable interface items be associated with the functions such as: performing optical character recognition (OCR), scanning, performing image recognition, shopping, cataloguing, or any combination thereof. In this embodiment, the user is able to select or confirm the function to be performed using this media content item. The selectable interface items can be icons, selectable text, images, etc.

Figure 2:
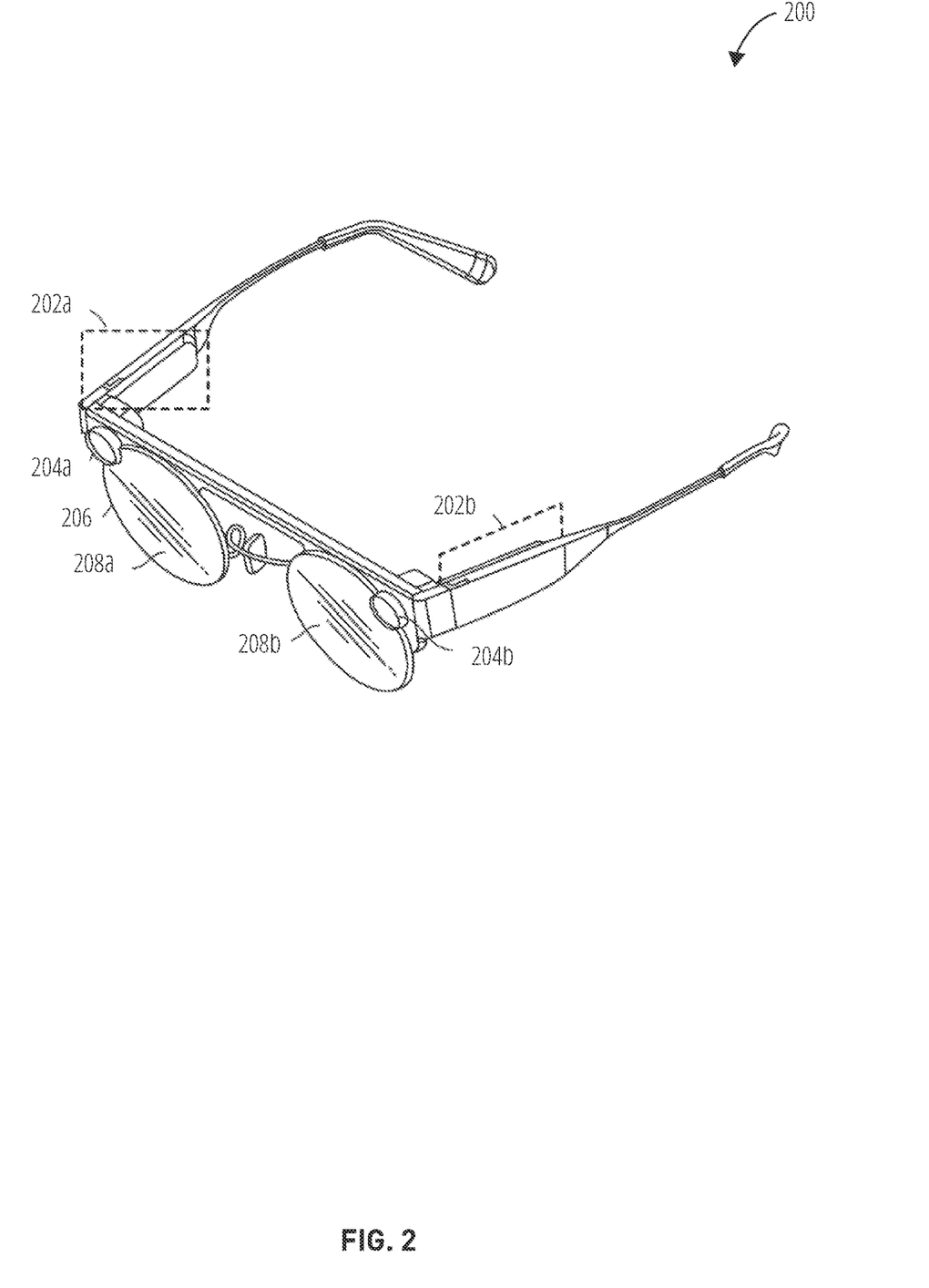
FIG. 2 illustrates a head-wearable apparatus 200 in which the selector input device 106 can be implemented according to one example embodiment

FIG. 2 illustrates a head-wearable apparatus 200 in which the selector input device 106 can be implemented according to one example embodiment. FIG. 2 illustrates a perspective view of the head-wearable apparatus 200 according to one example embodiment. In FIG. 2, the head-wearable apparatus 200 is a pair of eyeglasses. In some embodiments, the head-wearable apparatus 200 can be sunglasses or goggles. Some embodiments can include one or more wearable devices, such as a pendant with an integrated camera that is integrated with, in communication with, or coupled to, the head-wearable apparatus 200 or a client device 302. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 200 can be included in a client device 302 (e.g., machine 500 in FIG. 5) that can be used in conjunction with the head-wearable apparatus 200.

In FIG. 2, the head-wearable apparatus 200 is a pair of eyeglasses that includes a frame 206 that includes eye wires (or rims) that are coupled to two stems (or temples), respectively, via hinges and/or end pieces. The eye wires of the frame 206 carry or hold a pair of lenses (e.g., lens 208a and lens 208b). The frame 206 includes a first (e.g., right) side that is coupled to the first stem and a second (e.g., left) side that is coupled to the second stem. The first side is opposite the second side of the frame 206.

The head-wearable apparatus 200 further includes a camera module such as camera 108 (not shown) that includes camera lenses (e.g., camera lens 204a, camera lens 204b) and at least one image sensor. The camera lens 204a and camera lens 204b may be a perspective camera lens or a non-perspective camera lens. A non-perspective camera lens may be, for example, a fisheye lens, a wide-angle lens, an omnidirectional lens, etc. The image sensor captures digital video through the camera lens 204a and camera lens 204b. The images may be also be still image frame or a video including a plurality of still image frames. The camera module can be coupled to the frame 206. As shown in FIG. 2, the frame 206 is coupled to the camera lens 204a and camera lens 204b such that the camera lenses (e.g., camera lens 204a, camera lens 204b) face forward. The camera lens 204a and camera lens 204b can be perpendicular to the lens 208a and lens 208b. The camera module can include dual-front facing cameras that are separated by the width of the frame 206 or the width of the head of the user of the head-wearable apparatus 200.

In FIG. 2, the two stems (or temples) are respectively coupled to microphone housing 202a and microphone housing 202b. The first and second stems are coupled to opposite sides of a frame 206 of the head-wearable apparatus 200. The first stem is coupled to the first microphone housing 202a and the second stem is coupled to the second microphone housing 202b. The microphone housing 202a and microphone housing 202b can be coupled to the stems between the locations of the frame 206 and the temple tips. The microphone housing 202a and microphone housing 202b can be located on either side of the user's temples when the user is wearing the head-wearable apparatus 200.

As shown in FIG. 2, the microphone housing 202a and microphone housing 202b encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectro-mechanical systems (MEMS) microphones. The acoustic signals generated by the microphones can be pulse density modulation (PDM) signals.

In one embodiment, the selector input device 106 is coupled to one of the temples (or stems) of the frame 206. The user can activate the selector input device 106 on the temple to cause the camera 108 in the head-wearable apparatus 200 to capture a media content item and cause the head-wearable apparatus 200 to send the media content item to a server that performs a function using the media content item. The head-wearable apparatus 200 receives a result of the function from the server.

In one example, the selector input device 106 is a physical or virtual button, and the user of the head-wearable apparatus 200 can press or click the selector input device 106 to cause the camera 108 to capture a media content item (e.g., picture or video). In another example, the user of the head-wearable apparatus 200 can also press and hold down the selector input device 106 for a period of time to cause the camera 108 to capture the video that lasts the duration of the period of time that the user is pressing and holding the selector input device 106.

Figure 3:
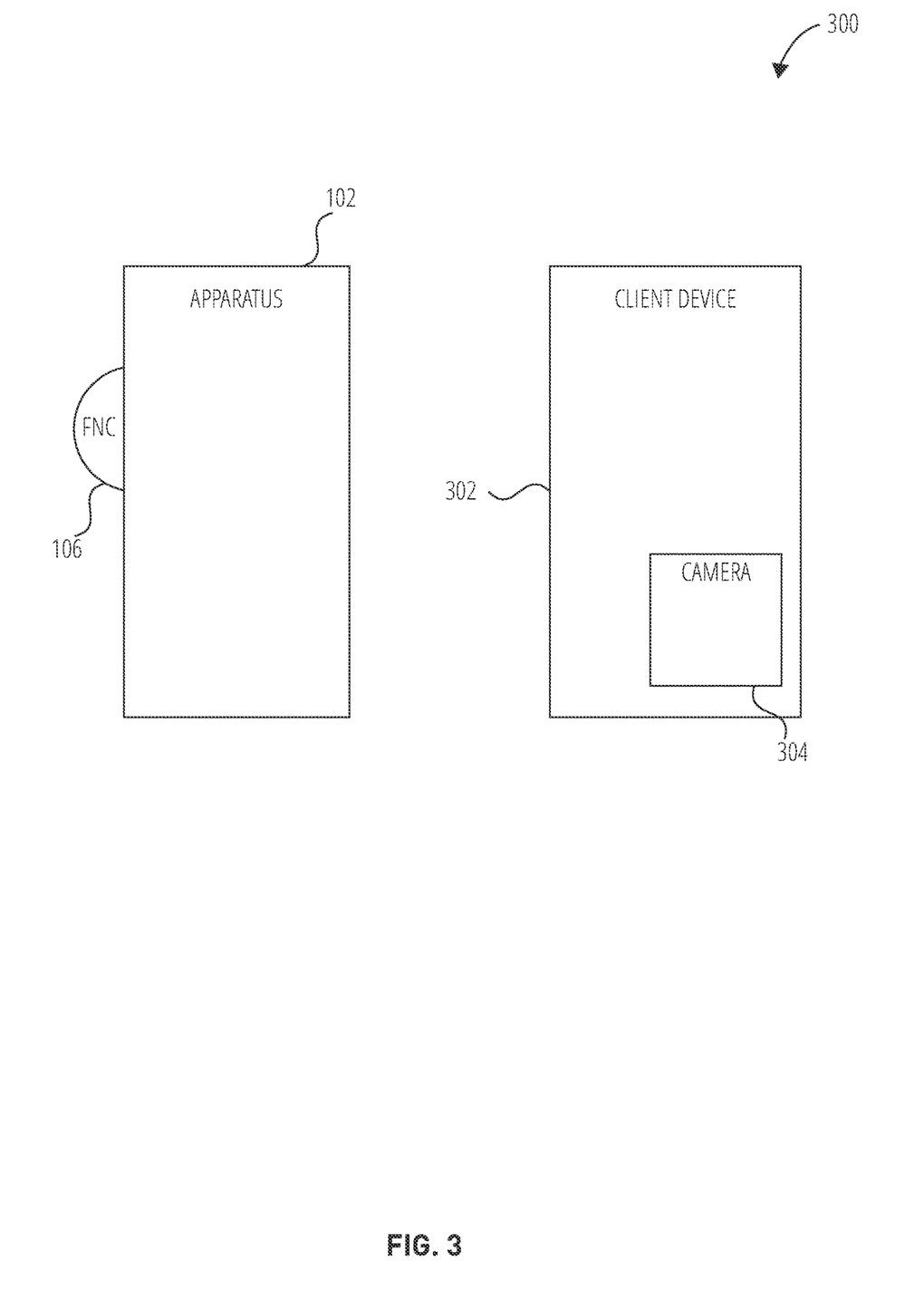
FIG. 3 illustrates a system 300 in which the apparatus 102 with the selector input device 106 can be implemented according to one example embodiment.

FIG. 3 illustrates a system 300 in which the apparatus 102 with the selector input device 106 can be implemented according to one example embodiment. In this embodiment, the system 300 includes an apparatus 102 including the selector input device 106 that is communicatively coupled to the client device 302 that comprises a camera 304. The apparatus 102 (or the selector input device 106) can be communicatively coupled via a wired connection (e.g., USB cables) or a wireless connection (e.g., WiFi, BlueTooth, 5G).

While not shown, instead of the apparatus 102 in system 300, the head-wearable apparatus 200 or other wearable device, can be included in the system 300 and include the selector input device 106 that is communicatively coupled to the client device 302. Some embodiments may include one or more wearable devices, such as a pendant with an integrated camera that is integrated with, in communication with, or coupled to, the client device 302. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

In FIG. 3, the apparatus 102 comprises a processor and a selector input device 106. The selector input device 106 is communicatively coupled to the client device 302. The client device 302 comprises a camera 304 which is also communicatively coupled to the selector input device 106. In this embodiment, in response to detecting activation of the selector input device 106 (or the function setting of the selector input device 106), the apparatus 102 causes the camera 304 of the client device 302 to capture a media content item, and the client device 302 to transmit the media content item to a server that performs a function using the media content item. The client device 302 (or the apparatus 102) can receive a result of the function from the server.

In the embodiments described herein, the selector input device 106 provides a more efficient system by decreasing the time and the steps required to capture a media content item and perform a function on the media content item. In some embodiments, the selector input device 106 also allows the user to not have to use of the camera 304 included in the client device 302. Instead, an activation of the selector input device 106 allows the user to use the camera 108 included in the apparatus 102. This further allows for faster media content processing since the user is not required to unlock the client device 302 to access the camera 304.

Further, the apparatus 102 can determine the function that the user wishes to perform based on an analysis of the media content item. In the embodiments described herein, the selection user input device 704 shortens the time or the steps required to perform operations such as shopping, scanning, image processing and performing OCR, etc. by anticipating the functions that are needed to be performed. Accordingly, the apparatus 102 is an improvement on the current systems because, for example, there is no need for the user to turn on his client device to capture the media content item, to perform separate online searches to shop, or to mail a picture to his laptop for image processing, etc.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Performing Operations on a Media Content Item Using the Selector Input Device

Figure 4:
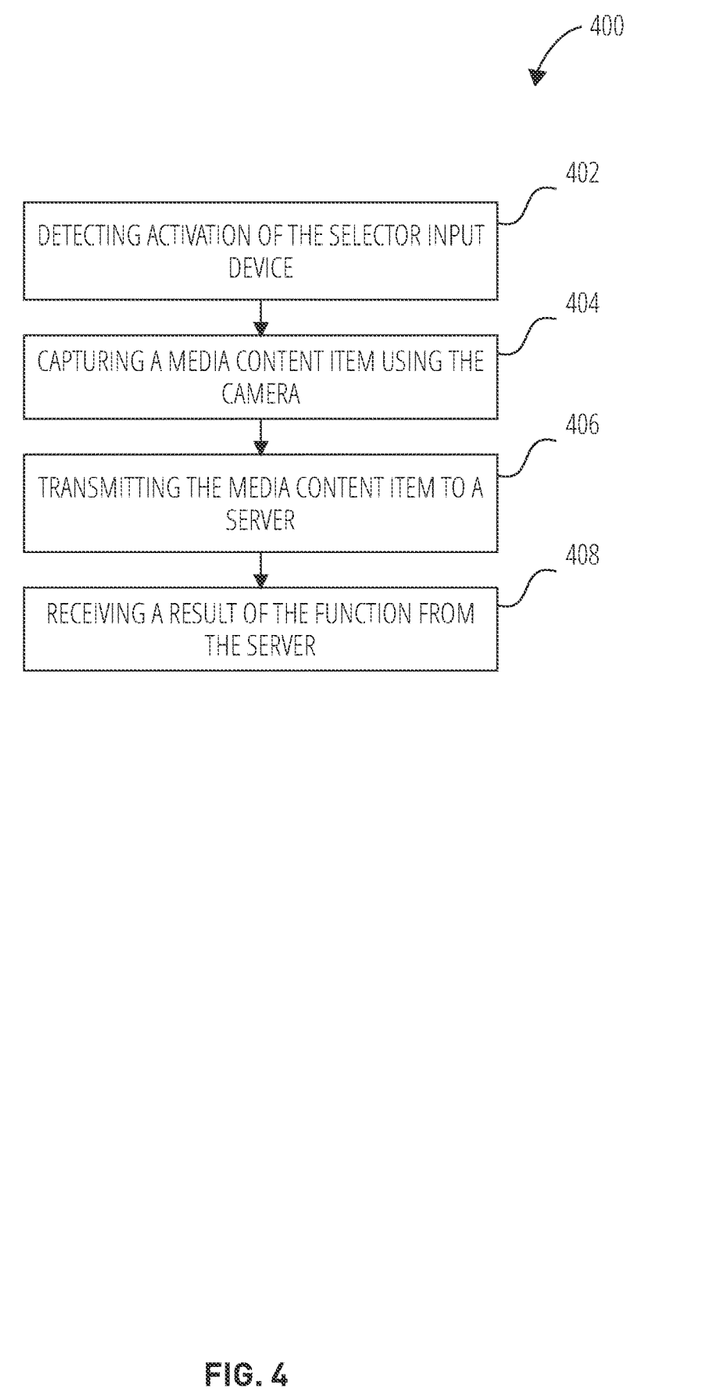
FIG. 4 is a flowchart for a process 400 of performing operations on a media content items using selector input device 106, in accordance with some examples.

FIG. 4 is a flowchart illustrating a process 400 of transmitting audio signals using the selector input device 106, in accordance with some examples.

At operation 402, the processor of the apparatus 102 detects activation of the selector input device 106. In one example, the selector input device 106 is a physical button or a virtual button. In one embodiment, the selector input device 106 is a rotary wheel. The activation of the selector input device 106 can comprise by pressing the rotary wheel. Prior to pressing the rotary wheel, the activation of the selector input device 106 can also comprise rotate the rotary wheel to a setting associated with performing a function on the media content item. In another example, the selector input device 106 can be a button and the activation of the selector input device comprises selecting a setting and pressing the button. In one example, the selector input device 106 is a slider having a plurality of positions and the activation of the selector input device comprises setting the slider to one of the plurality of positions.

In response to detecting the activation, the processor, at operation 404, causes capturing a media content item using the camera 108 of the apparatus 102 or a camera 304 of a client device 302, to which the apparatus 102 is coupled, to capture a media content item. The media content item can comprise an image or a video.

At operation 406, the processor transmits the media content item to a server that performs a function using the media content item. The function can be performing optical character recognition (OCR), scanning, performing image recognition, or any combination thereof.

In one example, performing image recognition comprises identifying an object in the media content item, identifying a product associated with the object, and obtaining information associated with the product via a network. The information associated with the product can be, for example, a price, a retailer, a seller, a make, a model, a brand, or product specifications. At operation 408, the processor receives a result of the function from the server.

In one example, the processor can further analyze the media content item to determine the function to be performed by the server based on the media content item, and transmit to the server an instruction to perform the function.

Machine Architecture

FIG. 5 is a diagrammatic representation of the machine 500 within which instructions 510 (e.g., software, a program, an application, an applet, an app, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the client device 302 or any one of a number of server devices forming part of a messaging server system. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the Processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 302 may have a camera system comprising, for example, front cameras on a front surface of the client device 302 and rear cameras on a rear surface of the client device 302. The front cameras may, for example, be used to capture still images and video of a user of the client device 302 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 302 may also include a 3600 camera for capturing 360° photographs and videos.

Further, the camera system of a client device 302 may include dual rear cameras (e.g., a primary camera as well as a depth-sensing camera), or even triple, quad or penta rear camera configurations on the front and rear sides of the client device 302. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface Component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
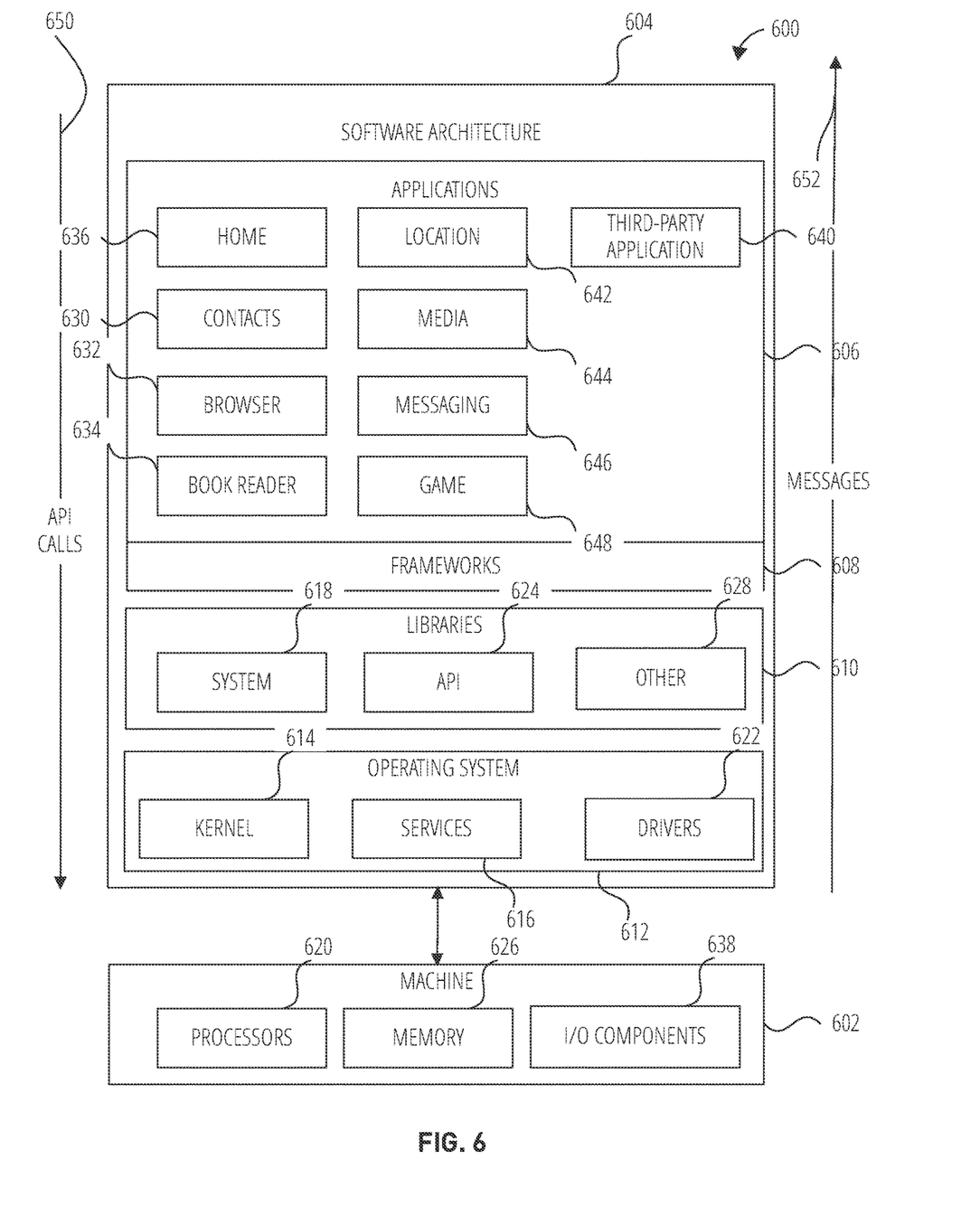
FIG. 6 is a block diagram showing a software architecture within which examples may be implemented.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

System with Head-Wearable Apparatus

Figure 7:
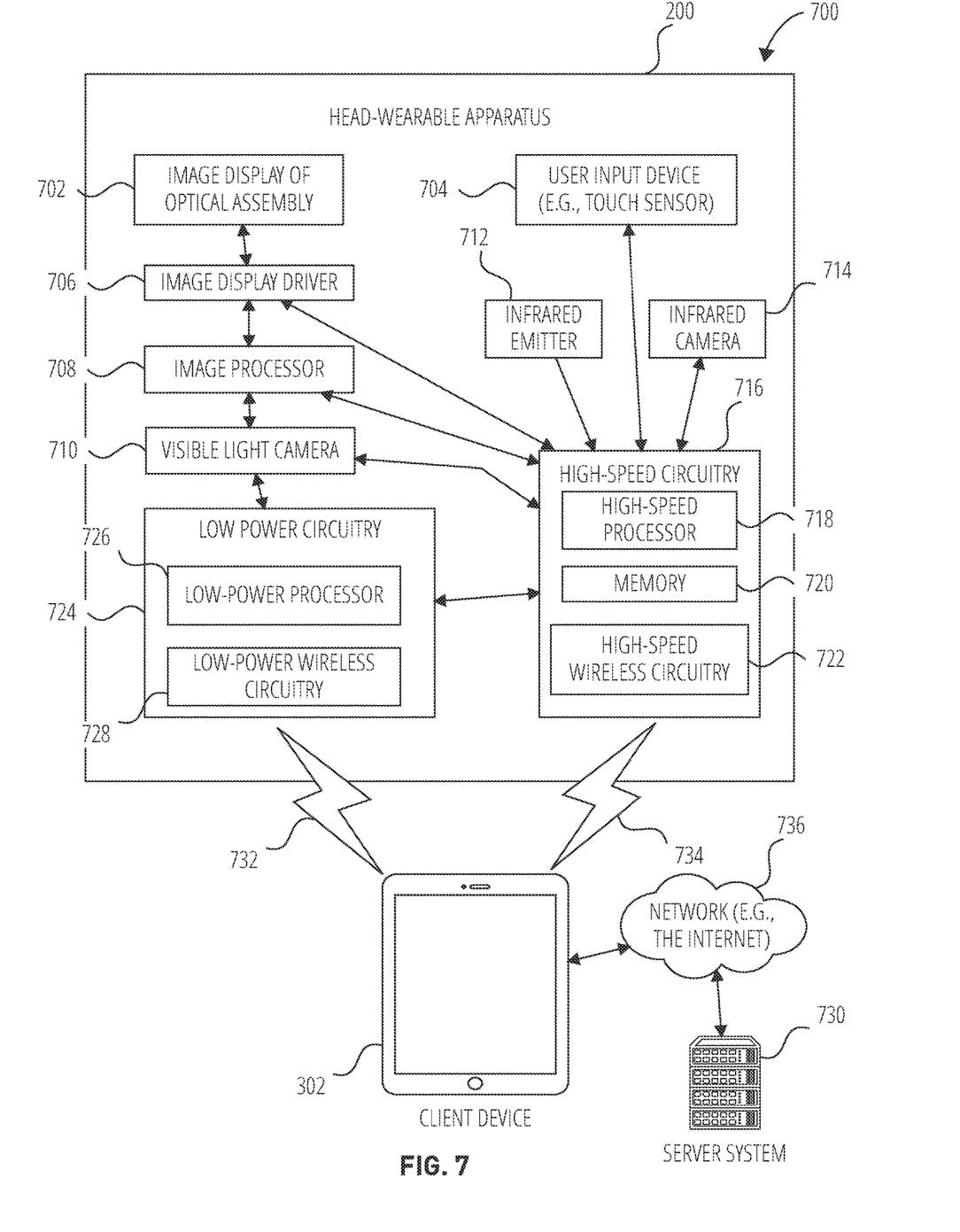
FIG. 7 illustrates a system 700 in which the head-wearable apparatus 200 with a selector input device 106 can be implemented according to one example embodiment.

FIG. 7 illustrates a system 700 in which the head-wearable apparatus 200 with a selector input device 106 can be implemented according to one example embodiment. FIG. 7 is a high-level functional block diagram of an example head-wearable apparatus 200 communicatively coupled a mobile client device 302 and a server system 730 via various network 736.

Head-wearable apparatus 200 includes a camera, such as at least one of visible light camera 710, infrared emitter 712 and infrared camera 714. The camera can include the camera module with the camera lens 204a and camera lens 204b in FIG. 2.

Client device 302 can be capable of connecting with head-wearable apparatus 200 using both a low-power wireless connection 732 and a high-speed wireless connection 734. Client device 302 is connected to server system 730 and network 736. The network 736 may include any combination of wired and wireless connections.

Head-wearable apparatus 200 further includes two image displays of the image display of optical assembly 702. The two image displays of optical assembly 702 include one associated with the left lateral side and one associated with the right lateral side of the head-wearable apparatus 200. Head-wearable apparatus 200 also includes image display driver 706, image processor 708, low-power low power circuitry 724, and high-speed circuitry 716. Image display of optical assembly 702 are for presenting images and videos, including an image that can include a graphical user interface to a user of the head-wearable apparatus 200.

Image display driver 706 commands and controls the image display of the image display of optical assembly 702. Image display driver 706 may deliver image data directly to the image display of the image display of optical assembly 702 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 200 includes a frame 206 and stems (or temples) extending from a lateral side of the frame 206. Head-wearable apparatus 200 further includes a user input device 704 (e.g., touch sensor or push button) including an input surface on the head-wearable apparatus 200. The user input device 704 (e.g., touch sensor or push button) is to receive from the user an input selection to manipulate the graphical user interface of the presented image.

The components shown in FIG. 7 for the head-wearable apparatus 200 are located on one or more circuit boards, for example a PCB or flexible PCB, in the rims or temples. Alternatively, or additionally, the depicted components can be located in the chunks, frames, hinges, or bridge of the head-wearable apparatus 200. Left and right visible light cameras 710 can include digital camera elements such as a complementary metal-oxide-semiconductor (CMOS) image sensor, charge coupled device, a camera lens 204a and camera lens 204b, or any other respective visible or light capturing elements that may be used to capture data, including images of scenes with unknown objects.

Head-wearable apparatus 200 includes a memory 720 which stores instructions to perform a subset or all of the functions described herein. Memory 720 can also include storage device.

As shown in FIG. 7, high-speed circuitry 716 includes high-speed processor 718, memory 720, and high-speed wireless circuitry 722. In the example, the image display driver 706 is coupled to the high-speed circuitry 716 and operated by the high-speed processor 718 in order to drive the left and right image displays of the image display of optical assembly 702. High-speed processor 718 may be any processor capable of managing high-speed communications and operation of any general computing system needed for head-wearable apparatus 200. High-speed processor 718 includes processing resources needed for managing high-speed data transfers on high-speed wireless connection 734 to a wireless local area network (WLAN) using high-speed wireless circuitry 722. In certain examples, the high-speed processor 718 executes an operating system such as a LINUX operating system or other such operating system of the head-wearable apparatus 200 and the operating system is stored in memory 720 for execution. In addition to any other responsibilities, the high-speed processor 718 executing a software architecture for the head-wearable apparatus 200 is used to manage data transfers with high-speed wireless circuitry 722. In certain examples, high-speed wireless circuitry 722 is configured to implement Institute of Electrical and Electronic Engineers (IEEE) 802.11 communication standards, also referred to herein as Wi-Fi. In other examples, other high-speed communications standards may be implemented by high-speed wireless circuitry 722.

Low-power wireless circuitry 728 and the high-speed wireless circuitry 722 of the head-wearable apparatus 200 can include short range transceivers (Bluetooth™) and wireless wide, local, or wide area network transceivers (e.g., cellular or WiFi). Client device 302, including the transceivers communicating via the low-power wireless connection 732 and high-speed wireless connection 734, may be implemented using details of the architecture of the head-wearable apparatus 200, as can other elements of network 736.

Memory 720 includes any storage device capable of storing various data and applications, including, among other things, camera data generated by the left and right visible light cameras 710, infrared camera 714, and the image processor 708, as well as images generated for display by the image display driver 706 on the image displays of the image display of optical assembly 702. While memory 720 is shown as integrated with high-speed circuitry 716, in other examples, memory 720 may be an independent standalone element of the head-wearable apparatus 200. In certain such examples, electrical routing lines may provide a connection through a chip that includes the high-speed processor 718 from the image processor 708 or low-power processor 726 to the memory 720. In other examples, the high-speed processor 718 may manage addressing of memory 720 such that the low-power processor 726 will boot the high-speed processor 718 any time that a read or write operation involving memory 720 is needed.

As shown in FIG. 7, the low-power processor 726 or high-speed processor 718 of the head-wearable apparatus 200 can be coupled to the camera (visible light camera 710; infrared emitter 712, or infrared camera 714), the image display driver 706, the user input device 704 (e.g., touch sensor or push button), and the memory 720.

Head-wearable apparatus 200 is connected with a host computer. For example, the head-wearable apparatus 200 is paired with the client device 302 via the high-speed wireless connection 734 or connected to the server system 730 via the network 736. Server system 730 may be one or more computing devices as part of a service or network computing system, for example, that include a processor, a memory, and network communication interface to communicate over the network 736 with the client device 302 and head-wearable apparatus 200.

The client device 302 includes a processor and a network communication interface coupled to the processor. The network communication interface allows for communication over the network 736, low-power wireless connection 732 or high-speed wireless connection 734. Client device 302 can further store at least portions of the instructions in the client device 302's memory to implement the functionality described herein.

Output components of the head-wearable apparatus 200 include visual components, such as a display such as a liquid crystal display (LCD), a plasma display panel (PDP), a light emitting diode (LED) display, a projector, or a waveguide. The image displays of the optical assembly are driven by the image display driver 706. The output components of the head-wearable apparatus 200 further include acoustic components (e.g., speakers), haptic components (e.g., a vibratory motor), other signal generators, and so forth. The input components of the head-wearable apparatus 200, the client device 302, and server system 730, such as the user input device 704, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Head-wearable apparatus 200 may optionally include additional peripheral device elements. Such peripheral device elements may include biometric sensors, additional sensors, or display elements integrated with head-wearable apparatus 200. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 732 and high-speed wireless connection 734 from the client device 302 via the low-power wireless circuitry 728 or high-speed wireless circuitry 722.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices: magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. An apparatus comprising:
   a camera comprising a camera lens and an image sensor;
   a selector input device;
   a processor; and
   a memory having instructions stored thereon, when executed by the processor, causes the processor to perform operations comprising:
   detecting activation of the selector input device,
   capturing a media content item using the camera, transmitting the media content item to a server, wherein the server performs a function using the media content item, receiving a result of the function from the server, and causing the result of the function to be displayed by a client device, wherein the apparatus is separate from the client device and is coupled to the client device.

2. The apparatus of claim 1, wherein the server performs the function including: performing optical character recognition (OCR), scanning, performing image recognition, or any combination thereof.

3. The apparatus of claim 2, wherein performing image recognition further comprises:
identifying an object in the media content item,
identifying a product associated with the object, and
obtaining information associated with the product via a network.

4. The apparatus of claim 3, wherein the information associated with the product including: a price, a retailer, a seller, a make, a model, a brand, or product specifications.

5. The apparatus of claim 2, wherein the processor to perform the operations further comprising:
analyzing the media content item to determine the function to be performed by the server based on the media content item, and
transmitting to the server an instruction to perform the function.

6. The apparatus of claim 1, wherein the selector input device is a rotary wheel, wherein the activation of the selector input device comprises rotating the rotary wheel to a setting, and pressing the rotary wheel.

7. The apparatus of claim 6, wherein the selector input device is a button, wherein the activation of the selector input device comprises selecting a setting and pressing the button.

8. The apparatus of claim 6, wherein the selector input device is a slider having a plurality of positions, wherein the activation of the selector input device comprises setting the slider to a position included in the plurality of positions.

9. The apparatus of claim 1, wherein the media content item is an image or a video.

10. The apparatus of claim 1, wherein the apparatus is a housing case or a device extension that is coupled to the client device.

11. The apparatus of claim 1, wherein the processor causes a display device of the client device to display the result of the function.

12. The apparatus of claim 1, wherein the apparatus is a head-wearable apparatus comprising:
a frame coupled to the camera; and
a first temple and a second temple coupled to opposite sides of the frame, wherein the selector input device is coupled to the first temple.

13. A system comprising:
a client device; and
an apparatus comprising:
a camera comprising a camera lens and an image sensor;
a selector input device;
a processor; and
a memory having instructions stored thereon, when executed by the processor, causes the processor to perform operations comprising:
detecting activation of the selector input device,
capturing a media content item using the camera,
transmitting the media content item to a server, wherein the server performs a function using the media content item,
receiving a result of the function from the server, and
causing the result of the function to be displayed by the client device, wherein the apparatus is separate from the client device and is coupled to the client device,
wherein the apparatus is separate from the client device and is coupled to the client device.

14. The system of claim 13, wherein the server performs the function including: performing optical character recognition (OCR), scanning, performing image recognition, or any combination thereof.

15. The system of claim 14, wherein performing image recognition further comprises:
identifying an object in the media content item,
identifying a product associated with the object, and
obtaining information associated with the product via a network.

16. The system of claim 14, wherein the processor to perform the operations further comprising:
analyzing the media content item to determine the function to be performed by the server based on the media content item, and
transmitting to the server an instruction to perform the function.

17. The system of claim 13, wherein the selector input device is a rotary wheel, wherein the activation of the selector input device comprises rotating the rotary wheel to a setting, and pressing the rotary wheel.

18. The system of claim 13, wherein the apparatus is a housing case or a device extension that is coupled to the client device.

19. The system of claim 13, wherein the processor causes a display device of the client device to display the result of the function.

20. The system of claim 13, wherein the apparatus is a head-wearable apparatus comprising:
a frame coupled to the camera; and
a first temple and a second temple coupled to opposite sides of the frame, wherein the selector input device is coupled to the first temple.

21. A system comprising:
a client device comprising a camera comprising a camera lens and an image sensor; and
an apparatus comprising:
a selector input device communicatively coupled to the camera;
a processor; and
a memory having instructions stored thereon, when executed by the processor, causes the processor to perform operations comprising:
detecting activation of the selector input device,
capturing a media content item using the camera,
transmitting the media content item to a server, wherein the server performs a function using the media content item,
receiving a result of the function from the server, and
causing the result of the function to be displayed by the client device, wherein the apparatus is separate from the client device and is coupled to the client device,
wherein the apparatus is separate from the client device and is coupled to the client device.

* * * * *